Figure 1:
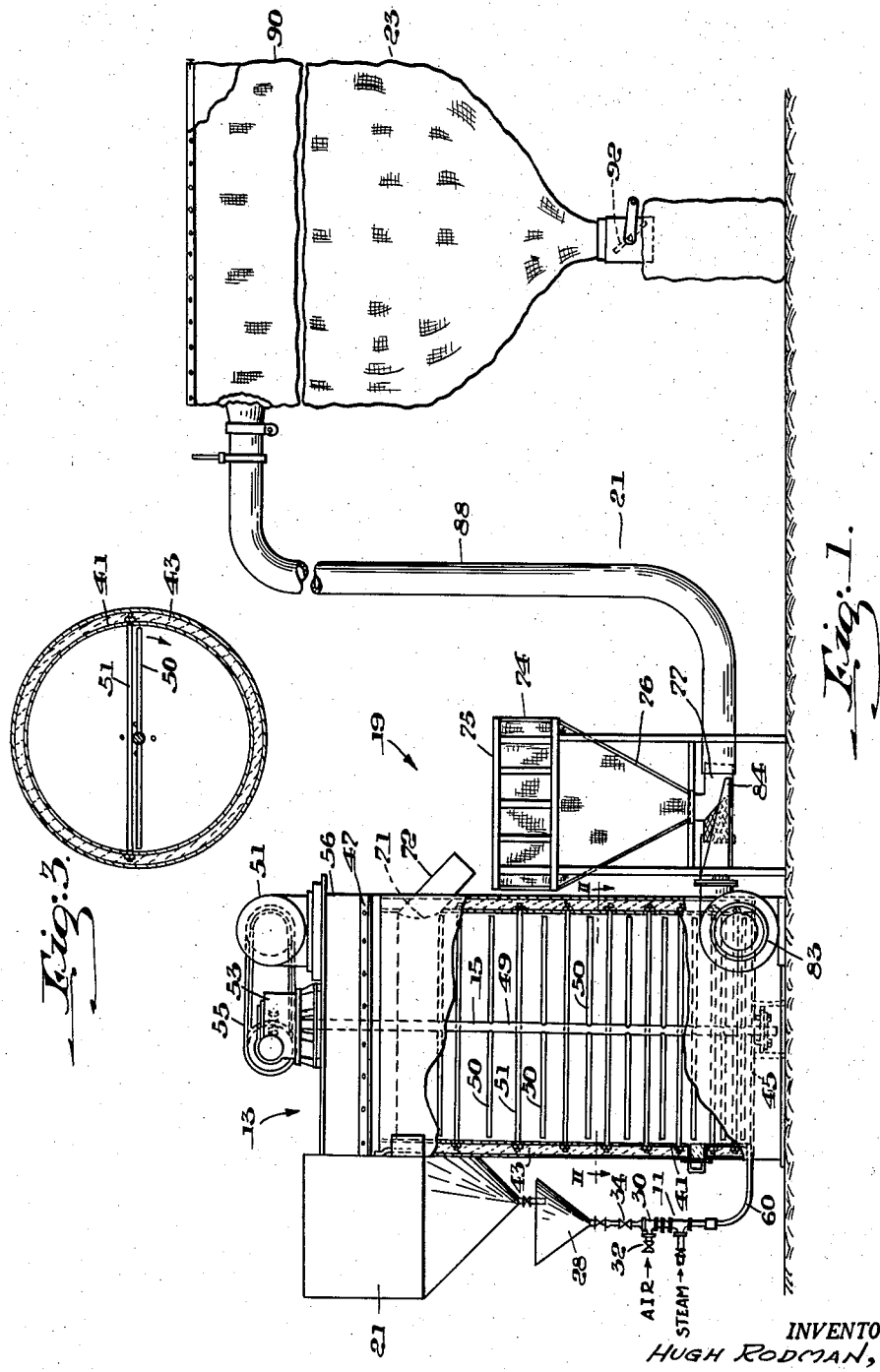

Feb. 27, 1962  H. RODMAN, JR  3,023,175
PROCESS AND APPARATUS FOR THE PRE-EXPANSION
OF VINYL POLYMERIC MATERIALS
Filed Oct. 9, 1957

2 Sheets-Sheet 2

INVENTOR.
HUGH RODMAN, JR.
BY James E. Armstrong
his ATTORNEY.

United States Patent Office 3,023,175
Patented Feb. 27, 1962

3,023,175
PROCESS AND APPARATUS FOR THE PRE-EXPANSION OF VINYL POLYMERIC MATERIALS
Hugh Rodman, Jr., Pittsburgh, Pa., assignor to Koppers Company, Inc., a corporation of Delaware
Filed Oct. 9, 1957, Ser. No. 689,195
3 Claims. (Cl. 260—2.5)

This invention relates generally to apparatus and process for the pre-expansion of expandable plastic particles.

The production of light-weight, shaped articles, such as toys, and of insulating layers molded to the required contours for refrigerators, freezer cabinets, trailer bodies and the like, is carried out by the expansion in molds of particles of a polymer having incorporated therein an expanding agent. Polymers of this type include polystyrene, polyvinyl chloride, polyvinylidene chloride, alkyl substituted styrenes, polyacrylic esters, and polymethacrylic esters; copolymers of styrene and alpha methyl styrene and also alkyl substituted styrene as vinyl toluene, copolymers of styrene with small amounts of divinyl benzene, copolymers of butadiene or other dienes or acrylonitrile and styrene in compositions having at least 50% styrene, and mixtures of polystyrene and rubbers, both natural and synthetic. The expanding agent may be a volatile aliphatic or cycloaliphatic hydrocarbon, such as petroleum ether, pentane, hexane, heptane, cyclopentane, cyclohexane, cyclopentadiene, and mixtures thereof, which has a boiling point lower than the softening point of the polymer. These expanding agents generally constitute 3 to 15% of the total weight of the mixture. These particles are generically known as beads and may be round, pillow-shaped, or irregularly shaped due to comminution.

Such beads are capable of great expansion; and when the beads are used directly for the molding, the beads may initially occupy less than 10% of the volume of the mold. As a result there is a tendency for the expansion of the beads not to be uniform; the material at the top of the mold for example may undergo greater expansion and therefore be less dense than the material at the lower part of the mold, particularly since the expanded material is a good insulator and the initial expansion of some of the material tends to insulate other parts of material not so completely expanded from adequate exposure to heat. To provide for uniform expansion in the mold, the expandable material is pre-expanded outside the mold to a material having substantially the bulk density required for the articles. This pre-expansion not only gives more uniformity in the molded parts but makes possible the production of less dense parts. Thereafter, the mold is substantially filled with this pre-expanded material and re-expanded to fit the contour of the mold. In this way, the details of the mold also appear sharper in the finished product. For mass production techniques, this pre-expanded material should be free-flowing and have substantially uniform bulk density. Heretofore, the pre-expansion of expandable polymers such as polystyrene has been difficult.

Hot water has been used, but agglomeration is a commonly experienced difficulty because the beads must be pre-expanded at a temperature only slightly lower than the temperature at which they are subsequently molded and at which later time they must fuse together. Infra red rays have also been used and the tendency here is to overheat one side of the bead thereby causing a collapse of the foamed structure and unevenly increased density, the heated side having a high density and the unheated side a lower density. Usually, the lowest bulk density achieved by the use of infra red heating is about two pounds per cubic foot. In commercial practice with infra red heating, the beads tend to fuse together while being exposed so as to form a lace which must be mechanically broken to produce a free-flowing product. Steam has been recognized as a desirable expanding agent but heretofore no usable process has been devised for the continuous expansion with steam.

An object of the present invention, therefore, is to provide a novel process and apparatus for the controlled pre-expansion of expandable polymers with steam to produce expanded polymers which are still capable of further expansion.

In accordance with this invention, the expandable beads are subjected to a temperature above the temperature at which the expanding agent becomes effective to expand the beads during which time the mass of beads is agitated to prevent agglomeration of the beads with each other and so that the lighter or expanded beads rise to the top of the mass and are removed. In one embodiment the expandable beads are mixed with steam and fed into a zone wherein a heated atmosphere is provided by the steam, mixing these beads with other beads of various degrees of expansion, the continual feed of beads into this zone causing the expanded beads to overflow this zone, and transporting the overflow to storage.

The invention also contemplates a novel apparatus for carrying out the novel process of the invention. This apparatus includes novel provisions for a heated atmosphere, for feeding the beads to the heated atmosphere, for stirring and expanding the beads in this atmosphere, and for transporting the beads to storage.

The above and further objects and novel features of the invention will appear more fully from the following detailed description when the same is read in conjunction with the accompanying drawings. It is to be expressly understood however that the drawings are not intended to be a definition of the invention but are for the purpose of illustration only.

Figure 2:
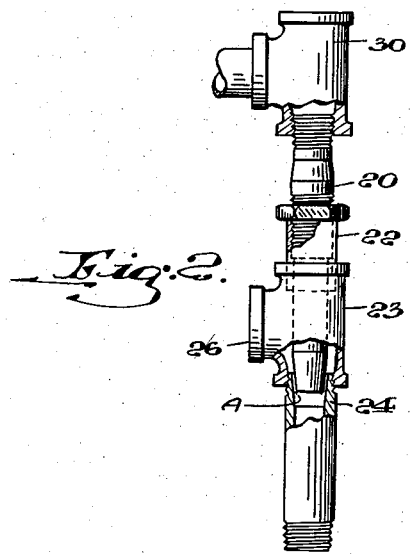
Figure 4:
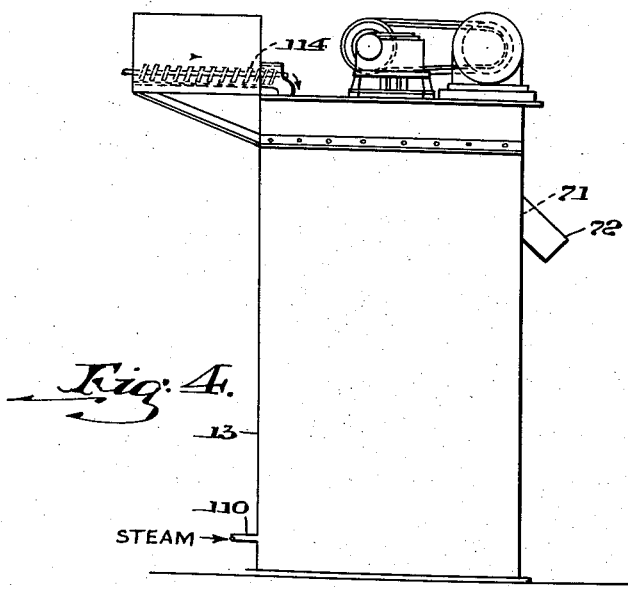

In the drawings wherein like parts are marked alike:
FIGURE 1 is a partially schematic elevational view of the novel apparatus of the invention, with portions broken away to illustrate details;
FIGURE 2 is a detailed view of the bead and steam feeding apparatus of FIGURE 1;
FIGURE 3 is a cross sectional view of the expansion vessel of FIGURE 1; and,
FIGURE 4 illustrates schematically another embodiment of the invention.

According to the invention, the expandable beads can readily be pre-expanded to a controlled extent. Thus, for example, the expandable polystyrene beads, available commercially under the name of "Dylite," can be readily expanded to forty times their original bulk weight, thus, expandable beads which have a bulk density of forty pounds per cubic foot may be pre-expanded to a bulk density of one pound per cubic foot. This pre-expansion is accomplished in accordance with the invention by continuously feeding expandable beads into a zone having a steam heated atmosphere and wherein the beads are mixed with other beads in various stages of pre-expansion, agitating said mixture whereupon the most expanded beads rise to the top of the mixture, and removing the latter beads from the mixture.

Novel apparatus for carrying out the invention is shown in FIGURE 1 as comprising generally a feeder 11 for mixing the expandable beads with steam and if desired for control purposes with air, a vessel 13 providing a heated atmosphere due to the steam therein and wherein the beads being fed into the vessel are mixed with the other beads therein, a stirrer 15 for agitating the mixture, a chute 72 for removing the expanded material from the top of the mixture, a separator 19 constituted of chute 72 and hopper 75 for separating the beads from the steam, and a conveying system 21 for transferring the pre-expanded beads to a storage 90.

The feeder 11 is illustrated in FIGURE 1 as a mixer for the beads, the air and the steam. Turning now to FIGURE 2, the feeder comprises a tube 20 which threads into or out of a positioning piece 22 which in turn threads into a T 23 while, into the other end of the T, a sleeve 24 is threaded to co-act with tube 20 for the formation of a venturi. To this end, the lower outside end of tube 20 is tapered, conveniently about 3°; the inside of sleeve 24 is similarly tapered, and the inside diameter of sleeve 24 is larger than the inside diameter of tube 20. Steam supplied under pressure through opening 26 of T 23 and through the opening between sleeve 24 and tube 20 creates a vacuum in tube 20. Beads falling through tube 20 from funnel 28 are entrained in the steam jet and blow downwardly into vessel 13. A second T 30 positioned between tube 20 and funnel 28 provides for the controlled entry of air through valve 32 to tube 20. A gate valve 34 between T 30 and funnel 28 also provide for the controlled entry of beads to tube 20. Thus, the vacuum exerted on tube 20 and the force of the jet formed between tube 20 and sleeve 24 can be controlled by the opening and closing of valves 32 and 34 and by the adjustments of tube 20 relative to sleeve 24 by threading tube 20 into or out from positioning piece 13.

In the operation of the feeder of FIGURE 2, it has been found that the higher the pressure of steam is on line 26, the smaller is the flow of steam required to maintain a proper vacuum and flow of material to vessel 13. If the flow through sleeve 24 be too slow, however, plugging may occur in the end of tube 20 due to the steam backing upwardly through tube 20 and thereby heating the beads to the softening point so that the beads agglomerate. The mixture of beads and steam and possibly air is fed through line 36 to the expanding vessel 13.

Vessel 13 constitutes the zone having a steam heated atmosphere and is illustrated in FIGURE 1 as an upright cylinder 41 suitably jacketed with insulating material 43 and having a smooth flat insulated bottom plate 45 and closed at the top with an insulated lid 47 which is also insulated. The lid is advantageously made light weight and suitably hinged so as to open in the event of the discharge chute 72 plugging for some reason. While this vessel may be of conventional mild steel with the inner side painted to prevent corrosion from moisture, it is advantageously made of stainless steel with a clear, smooth surface.

To agitate the beads, a shaft 49 extends axially the length of cylinder 41 and is provided with stirring bars 50 which project radially almost to the inner walls of cylinder 41. Stirring bars 50 are spaced at distances progressively greater apart from the lower bar to the upper bar. This progression of distances between the bars may be conveniently expressed by the formula $$X + NA$$

where

X is the space from the lower bar to the bottom plate of the vessel,
A is a factor by which the spacing between the bars increases, and
N is the number of bars from the lower bar.

At approximately the midpoint between stirring bars 50 and extending across the vessel chordlike are bars 51 fixed to the drum in a suitable manner as by welding or by bolting and so positioned to barely clear the shaft 49. These fixed and movable bars are illustrated herein as being rounded but they may be oval or blade shaped if desired. To achieve greater agitation, the fixed and movable bars may have affixed thereto, meshing vertical bars at various radii.

Shaft 49 is journaled in the upper and lower members 47, 45 and extends through the upper member 47 into a variable speed transmission box 53. The transmission box 53 is driven by a suitable electric motor 51 through a conventional V-belt 55. This transmission box and motor are rotatably mounted on channel bars 56. This variable speed transmission permits the speed of shaft 49 to be varied in accordance with the condition of the beads to be expanded, for example, so that the speed can be increased if the beads show a tendency to agglomerate.

The critical area for agitation is the lower portion of vessel 13; and if the agitation at this point is not sufficient, the partially expanded beads will heat and build up in the lower portion of the drum, and thereafter, lumps will break off this built-up mass and appear as agglomerants in the product. The stirring mass of beads tends to swirl in the drum with a circular motion and assume the characteristics of a stirring liquid. This behavior influences the speed of stirring: high speed stirring may cause a pronounced vortex which can become so deep that steam can escape through the vortex without passing through the beads; but on the other hand, low speed stirring may not be sufficient to prevent the particles from fusioning and agglomerating and forming lumps. It has been found that the mass of the expanding beads revolves in the vessel at a speed somewhat less than half the speed of the moving bars. It has also been found that whereever an appreciable roughness or obstruction exists, the beads extend to hang in the eddy on the downstream side.

The feed pipe 60, which connects mixer 11 with drum 13, is arranged to feed the mixture of beads and steam horizontally into the lower portion of cylinder so that the beads enter the vessel in a direction somewhere between the radius and the tangent of the circle formed by plate 45 and so that the feed merges with the circulated mass. It is to be noted that the mixture carries the beads into the expansion vessel and also supplies the heat to cause the pre-expansion of the beads in the vessel. The beads of this mixture enter the vessel and mix with the other beads therein which are in various stages of expansion.

As the beads continue to be fed into the vessel and expand the liquid-like characteristics of the stirring mass cause the lighter, that is, the more expanded particles to rise to the top of the mass.

To provide for the removal of the pre-expanded particles, a small square hole 71 is provided at the top of cylinder 41. An overflow chute 72 intersects this hole 71 approximately at a tangent to cylinder 41 so as to guide the overflowing material away from cylinder 41 without the overflowing beads being hurled against the side of the chute. The chute also extends downwardly at an angle greater than 45° below the horizontal plane to provide a sufficient angle of inclination so that the beads will not pile up in the chute and block it. The chute 72 conducts the beads to a hopper 75 having a cylindrical portion 74 and a conical portion 76, both portions being a screened mesh; the chute however stops short of the hopper to provide a free fall area for the beads. The open chute, this free fall area, and the open mesh of the hopper constitute a separator whereby the steam separates from the beads.

The expansion of the beads creates a partial vacuum in the beads and for a short time after this expansion the beads must be handled gently to prevent their being crushed. These beads have been found to be susceptible to shinkage during the first ten to fifteen minutes after the expansion; and the lower the density, the greater this shrinkage may be. It is during this time that the air from the atmosphere is diffusing into the beads through the cell walls of the beads to equalize to some extent the vacuum within the cell of the beads.

To provide for the gentle transportation of the beads a power-driven blower 83 provides a flow of air to a flattened nozzle 84 in a venturi 77. The air flow creates a vacuum in venturi 77 thereby drawing beads from hopper 75, and flows these beads to a cotton mesh bag 90.

This arrangement sends the beads to temporary storage 90 with negligible shrinkage. For example, beads which leave outlet 71 of vessel 13 with a density of 1 lb./cu. ft. may be recovered from bag 90 with the density of 1.05 lb./cu. ft. less. The air flows through the mesh of bag 90; and the cool and stable beads may be removed from the bag through a conventional butterfly valve 92 for suitable packing. It has been found that such beads have a shelf life of about seven days when stored in a closed container; but it is advantageous to use the beads within three days after this pre-expansion.

In operation, the vessel 13 may be preheated for about ten to fifteen minutes with a relatively slow flow of steam through feeder mechanism 11 and any condensate that appears in the drum may be removed through clean out door 79 at the lower edge of the cylindrical ball of the drum so that the condensate will not wet the product, or remain trapped in the drum. This pre-heating is not essential; but depending upon the material being pre-expanded is sometimes desirable. The drum is about fifty percent filled with pre-expanded material, the agitator 49 is started, and steam is passed through line 60 into vessel 13. Within a few minutes, vessel 13 will be filled with expanded material. Thereafter, the feeding of the raw beads is commenced by opening valve 34. The rate of feeding may be measured by timing the flow of beads from the chute 72. The density of the product coming from chute 72 can be adjusted by adjusting the rate of feed by way of valve 34, the amount of air by valve 32, and the amount of steam entering mixer 11. The material which overflows to hopper 75 is carried by air from nozzle 84 through line 88 to the storage bag 90.

If further expansion of the bead is desired, the beads may again be fed from storage bag 90 into a hopper 21 and back through expander 13. However, the pre-expanded beads should be allowed to cool between expansions so that air may be allowed to diffuse into the beads, for it has been found that unless this resting occurs, substantially no further expansion occurs with further steaming. It has been found that the further expansion increases as the resting time is increased to about 90 minutes; and thereafter, any further resting does not seem to affect the extent of further expansion.

The quality or initial pressure of the steam have little influence on the bulk density of the material leaving vessel 13; but increasingly wet steam, as might be expected, does result in plugging troubles at the lower end of bead tube 20.

The reason for the effect of air on the bulk density is not known. But it has been found that increased bulk density accompanies an increase in the amount of air supplied with the steam and beads; and whether this air is heated or is cold makes little difference.

It has been found that the bulk density is also somewhat proportional to the residence time of the beads in the expanding vessel 13 up to a time beyond which further exposure results in no appreciable increase in bulk density. This residence time is controlled by controlling the rate of flow of beads into the vessel.

It has also been found that the temperature throughout the expansion vessel 13 is substantially constant, i.e., 100° C.

The particular dimensions of expanding vessel 13 are not critical although the greater the heighth of vessel, the greater the pressure applied to the beads at the lower levels of the vessel and excessive heights may tend to agglomerate the beads. Also while the embodiment of FIGURE 1 illustrates a cylindrical reaction vessel, the reaction vessel may be of other forms, such as hemispherical or conical. In the latter case, however, the stirring bars movable with the shaft should terminate as T shaped projections so as to tend to wipe the side walls of the vessel.

A typical example will be illustrated using a two hundred gallon expanding vessel which has an inside diameter of about thirty inches, and a height of about 60 inches and which is provided with an agitator having eight pairs of bars of one half inch diameter co-acting with seven fixed bars of the same diameter, which is provided with a one inch inlet for the mixture of beads and steam and which is provided with a four inch square outlet for the overflow of pre-expanded particles. With the agitator driven at the rate of one hundred fifty revolutions per minute and the feed rate of the polymer bead at three hundred pounds per hour, pre-expanded material is produced having a bulk density of about one pound per cubic foot. The polymer beads initially were of polystyrene having 7% by weight of petroleum ether incorporated therein and a bulk density of about 39 pounds per cubic foot. After resting and cooling the material for ninety minutes, the pre-expanded material is again processed for pre-expansion to obtain a product which has a bulk density of about eight-tenths pound per cubic foot and which is still capable of further expansion.

FIGURE 4 shows another embodiment of the invention. The embodiment of FIGURE 4 differs from that of FIGURE 1 in that steam only is fed into the bottom of vessel 13 through a line 110 while the expandable beads are fed into the upper portion of vessel 13 by a suitable means such as a screw conveyor 114. These beads mix with the whirling bead mass in the reactor and the heavier beads gravitate rapidly to the bottom of the reactor. As such gravitation takes place the beads become warm due to the steam heated atmosphere in vessel 13, the beads expand and due to the fluid-like characteristics of the mass rise again to the top of the mass, and overflow through opening 71.

The foregoing has presented novel process and apparatus for the pre-expansion of polymeric material that can be further expanded in a mold. The product produced by this invention is uniformly expanded, is relatively free-flowing after disengagement from the steam as it falls free from the chute, and its bulk density may be controlled upwardly from one pound when fed with unexpanded beads. By recycling the one pound pre-expanded product of an initial expansion, further decrease in density may be achieved.

Although the foregoing has illustrated and described in detail several embodiments of the invention, it is to be expressly understood that various changes can be made in the design and arrangement of the parts without departing from the scope of the invention as will now be understood by those skilled in the art.

What is claimed:

1. In an apparatus for making free-flowing, particulate, low density partially expanded vinyl polymers which are capable of further expansion from foamable vinyl polymers, having incorporated therein 3–15% by weight of a normally liquid, volatile aliphatic hydrocarbon having a boiling point below the softening point of the polymer, by treatment with steam, the improvement comprising an upright vessel having closed ends, means for supplying a mixture of steam and particles of said foamable polymer to said vessel, an agitator mounted longitudinally of said vessel and having radially extending members along the length of said agitator, said members being constructed and arranged at distances progressively greater apart from the lower member to the upper member, the progression of distances being measured according to the formula $X+NA$, wherein X is the space from the lower of said members to the bottom plate of said vessel, A is a factor by which the spacing between the members increases, and N is the number of members from the lower member, the aforesaid arrangement providing for rapid stirring of the particles and the elimination of crushing of partially expanded particles, fixed bars extending as chords across said vessel and interposed between said radially extending members, whereby particles just entering said vessel are subjected to mixing with other particles previously in said vessel and the entire mass of particles moves at a rate less than half of that of the agitation applied, thereby preventing agglomeration of said mass, and means for overflowing the free-flowing particulate partially expanded polymer from the upper portion of said vessel.

2. Method according to claim 3, wherein said polymer is polystyrene.

3. In a method of making free-flowing, particulate, low density partially expanded vinyl polymers which are capable of further expansion from foamable vinyl polymers, having incorporated therein 3–15% by weight of a normally liquid, volatile aliphatic hydrocarbon having a boiling point below the softening point of the polymer, by treatment with steam, the improvement comprising continuously feeding the foamable polymer particles to the lower portion of a steam-filled zone wherein the particles are subjected to a temperature at which partial volatilization of the aliphatic hydrocarbon occurs, thereby forming a low density partially expanded polymer capable of further expansion, rapidly agitating the mass of particles in said zone to cause said partially expanded particles to travel centrifugally and upwardly through said zone by rapidly rotatively stirring the mass of particles in said zone while passing steam therethrough thereby eliminating crushing of the individual particles, concomitantly obstructing the centrifugal and upward movement of said mass in said zone thereby restraining the movement of said particles so that the mass moves at a rate less than half of that of the agitation applied thereby preventing agglomeration of said mass, and removing said free-flowing, particulate partially expanded polymer from the top of said mass.

References Cited in the file of this patent

UNITED STATES PATENTS

| | | |
|---|---|---|
| 1,997,301 | Kniffen et al. | Apr. 9, 1935 |
| 2,626,786 | McGlothin | Jan. 27, 1953 |
| 2,676,927 | McCurdy et al. | Apr. 27, 1954 |
| 2,787,809 | Stastny | Apr. 9, 1957 |
| 2,806,298 | Rossi | Sept. 17, 1957 |
| 2,816,827 | Roth | Dec. 17, 1957 |
| 2,911,730 | Schaub et al. | Nov. 10, 1959 |

OTHER REFERENCES

"Dylite," Expandable Polystyrene, publication of the Koppers Company, Inc., copyright 1954, page 18.